United States Patent [19]

Matsuda

[11] 4,316,052
[45] Feb. 16, 1982

[54] GAS INSULATED TRANSMISSION LINE HAVING TWO-LEGGED SPACERS DISPOSED IN A RECEIVING STRUCTURE

[75] Inventor: Setsuyuki Matsuda, Amagasaki, Japan

[73] Assignee: Mitsubishi Denki Kabushiki Kaisha, Tokyo, Japan

[21] Appl. No.: 160,246

[22] Filed: Jun. 17, 1980

[30] Foreign Application Priority Data

Jun. 25, 1979 [JP] Japan .................................. 54-80900

[51] Int. Cl.³ .......................... H01B 9/06; H02G 5/06
[52] U.S. Cl. .................................... 174/14 R; 174/27; 174/28; 174/99 B
[58] Field of Search ............. 174/14 R, 16 B, 21 CA, 174/27, 28, 99 R, 99 B, 99 E, 149 B; 138/108, 112, 113, 114; 248/55

[56] References Cited

U.S. PATENT DOCUMENTS

| 286,940 | 10/1883 | Martin | 174/99 R X |
| 3,751,578 | 8/1973 | Hoffmann | 174/99 B |
| 3,963,205 | 6/1976 | Hageman | 248/55 |
| 4,110,551 | 8/1978 | Cookson | 174/27 |

FOREIGN PATENT DOCUMENTS

2316100  10/1974  Fed. Rep. of Germany .... 174/99 B

Primary Examiner—Laramie E. Askin
Attorney, Agent, or Firm—M. S. Yatsko

[57] ABSTRACT

A gas-insulated transmission line is formed of a plurality of outer sheath sections joined together lengthwise, with a conductor disposed therein. A two leg insulating spacer supports the conductor within the sheath sections, and axially extending grooves on said sheath sections receive the ends of the insulating spacer.

4 Claims, 6 Drawing Figures

GAS INSULATED TRANSMISSION LINE HAVING TWO-LEGGED SPACERS DISPOSED IN A RECEIVING STRUCTURE

BACKGROUND OF THE INVENTION

This invention relates to a gas insulated transmission line connected to a gas insulated substation.

Gas insulated miniclad substations have come to be widely employed due to the concentration of and the increase in power demand in towns and cities and with the view of territorial problems, countermeasures to public hazards, and the like. Transmission lines connected thereto also tend to utilize gas insulation. Gas insulated transmission lines are constructed so that the metallic sheath includes therein a conductor supported by solid insulators and is charged with a gas having good insulating properties and put under from 3 to 4 atmospheric pressures of, for example, $SF_6$. The wide application of such a construction of long transmission lines depends upon their simplification, miniaturization and reliability. Further, the lines should be easy to install at the site and long in life.

In gas insulated transmission lines there exists the single phase type including a conductor for each phase disposed in one other sheath, the three-phase bundled type including conductors for three phases disposed in one sheath, or the multiphase type. The present invention relates to gas insulated transmission lines of the types as described above and aims at the provision of what is simple in structure, easy in assembling and excellent in economy.

SUMMARY OF THE INVENTION

In accordance with this invention, a gas insulated transmission line comprises a plurality of lengthwise connected outer sheath sections having a conductor disposed therein supported by an insulating spacer. The spacer is of the two-leg variety with its two ends being received in receiving means which are provided in the sheath sections and which extend axially of and throughout the length of the connected sheath sections.

BRIEF DESCRIPTION OF THE DRAWINGS

Reference is now made to the description of the preferred embodiments, illustrated in the accompanying drawings, in which.

DESCRIPTION OF THE PREFERRED EMBODIMENTS

Figure 1:
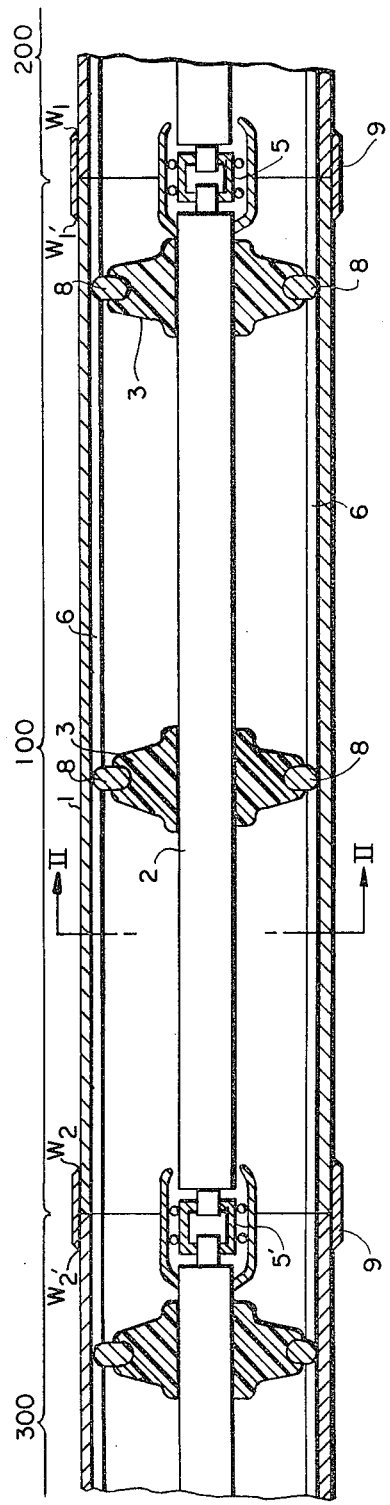
FIG. 1 is a longitudinal sectional view of a gas insulated transmission line according to the present invention.

A single-phase type embodiment of the present invention is described in conjunction with FIG. 1. One section 100 of a gas insulated bus is welded and connected to other sections 200, 300 of bus through connecting rings 9 as shown, for example, by the welds $W_1$, $W_1'$, and $W_2$, $W_2'$ resulting in a lengthened transmission line. It is desirable to weld preliminarily one of the welds $W_1$ or $W_1'$ and one of the welds $W_2$ or $W_2'$ at the manufacturing facility. Accommodated in each single section 100 are a single conductor 2, and two double-leg type insulating spacers 3 integrated with one another in an outer sheath 1 in the form of, for example, a hollow circular cylinder. The integration of the conductor 2 with the insulating spacers 3 is accomplished, for example, by cutting one portion of the conductor 2 into short lengths, mounting the insulating spacers 3 to this portion by molding an epoxy resin or the like integrally therewith, and welding the conductor 2 of a suitable length to the portion of the conductor 2 made integral with the insulating spacer 3 thereby to make up the conductor 2 of a predetermined length integral with the insulating spacers 3.

Such integrated members are different in extents of thermal expansion and contraction relative to the sheath 1 resulting from a difference in temperature between the sheath 1 and the conductor 2, a difference in coefficient of thermal expansion due to a difference in material and so forth. For this reason, the ends of the conductor 2 in the unit 100 are supported by sliding contact members 5 and 5' extending over the ends of the corresponding conductor in the unit 200 or 300, for example, of a structure illustrated to be expandible and contractible axially of the sheath 1. Accordingly, a difference in expansion or contraction can be absorbed while a current is conducted through the sliding contact members 5, 5'.

Since the insulating spacers 3 are of the double leg type, a sufficient strength is imparted to the insulating spacers 3 integral with the conductor 2 by supporting both ends thereof. Also, the double leg type insulating spacer 3 is not only advantageous in view of saving resources and the reliability of the insulation performance but also it has advantages over the simple single-leg type spacers of the prior art, although there exists problems concerning the strength and trouble of the fixation to the sheath 1.

The sheath 1 is formed on the inner wall surface 103 with receiving means extending axially thereof to receive ends 8 of the insulating spacers 3 in the form of grooves 6. In the embodiment illustrated, the grooves 6 extend throughout the length of the sheath section 1. In this case, if the sheath 1 is formed of a material capable of being extrusion-molded, such as aluminum, then the grooves 6 can be formed easily and integrally with the sheath 1 and simultaneously with the extrusion of the sheath 1.

Instead of the grooves 6 being formed on the inner wall surface 103 of the sheath 1 per se, the grooves 6 may be preliminarily formed on separate members, and said members then mounted in the sheath by suitable means (not shown).

Forced into the sheath 1, having come to have the grooves 6 in this way, are the ends 8 of the insulating spacers 3 integral with the conductor 2 to complete extremely simply the assembling of each unit 100. For the connection of the units 100, 200 and 300 to one another, adjacent ends of the conductors are interconnected by means of the contact member 5 and 5' and then the coupling is effected through the connecting ring 9 as by the welding as described above.

The end 8 of the insulating spacer 3 is integrally molded with a material different from that of the main body of the spacer 3, such as aluminum or brass, or another filler metal and has a sufficient supporting strength. Also, by fixing the ends 8 of one insulating spacer 3 among the units to the groove 6 by welding or other suitable means, the relative positions of the conductor 2 and the insulating spacer 3 are fixed with respect to the sheath section 1 so that they can withstand vibrations during the transportation of the units or in use of transmission lines.

Figure 3:
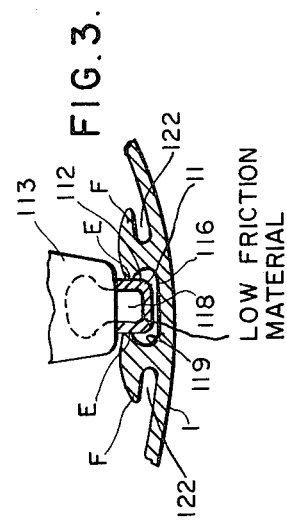
FIG. 3 is a fragmental sectional view of another embodiment of the receiving means.
Figure 2:
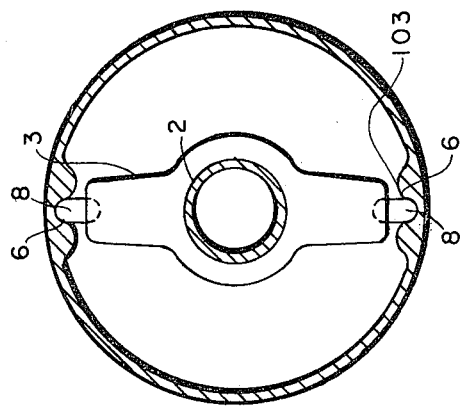
FIG. 2 is a sectional view taken along the line II—II of FIG. 1.

FIG. 3 shows a modified example of the groove 116 and the end 118 of the insulating spacer 113. The cross section of the inner groove wall 119 is substantially in the form of a C so that its width in the circumferential direction of the sheath 1 is more widened in the interior than at the opening 112 of the groove 116. Also the end 118 is coated with an easily slidable material 11 such as Teflon. Since the end 118 has a Teflon coating, it is possible to force easily the insulating spacers 113 into the grooves 116 upon assembling and less of a wear powder is generated during service whereby the resulting bad influences upon the insulation performance is minimized. The groove 116 has at the edge of the opening 112 protrusions E and F extending in the opposite directions along the inner surface of the sheath 1 and therefore spaces 122 between those protrusions E, F and the inner surface of the sheath 1 become impurity capture grooves at a low electric field to capture impurities in the $SF_6$ gas.

Figure 4:
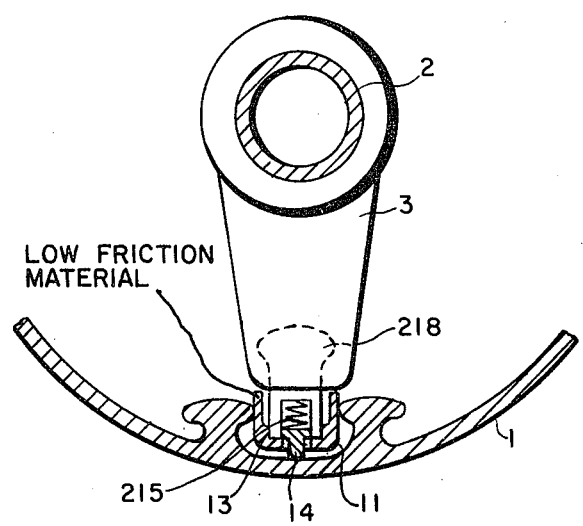
FIG. 4 is a fragmental sectional view of still another embodiment of the receiving means.

FIG. 4 shows still another modified example of the end 218 wherein, in order to put a metal contact member 14 at the end 218 with the Teflon coating at the same potential, the metal contact member 14 is provided with a hole 215 in which a spring 13 is disposed. The contact member 14 is biased against the inner wall surface of the sheath 1 by means of the spring 13 to be electrically connected thereto.

Figure 5:
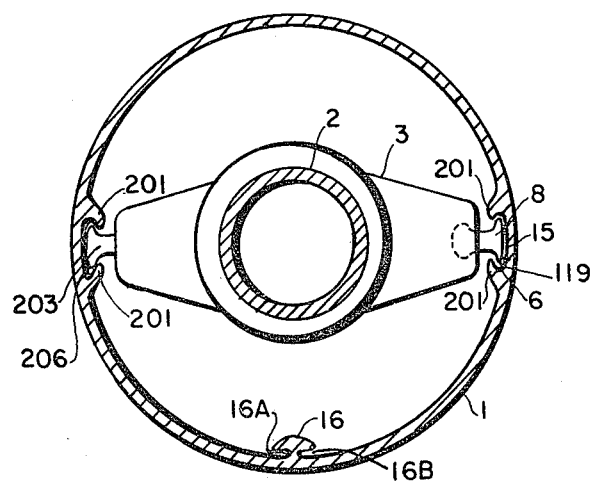
FIG. 5 is a view of a still different other embodiment corresponding to FIG. 2.

FIG. 5 is still another modified example of the end 8 wherein the double leg type insulating spacer 3 is substantially horizontally disposed and its two ends 8 are inserted into the grooves 6. However, it is constructed so that, due to the presence of the protrusions 201, the end 8 is shaped into a large diameter portion 15 corresponding in shape to the groove 6 having the cross section of the inner wall 119 made into a substantially C shape and the lower end 203 of the large diameter portion 15 is received by the lowermost surface 206 of the C-shaped groove 6. Therefore, the wear powder due to the sliding movement is left within the groove 6 and not scattered in the interior of the sheath 1, so that a decrease in insulation due to impurities in the gas can be effectively prevented. In the use of the horizontal disposition such as described above, impurities, even if they exist within the sheath, are liable to precipitate downward, which can prevent the sticking of the impurities to the surface of the insulating spacers 3 that so contributes to a decrease in insulation.

The large diameter portion 15 at the end 8 of the spacer 3 may be changed to a roller consisting of a suitable metallic material or a suitable insulating material to be rotatable along the groove, although this modification is not illustrated. In this case, the wear powder is also small in quantity and a high thrusting force is not required upon assembling.

Further, in order to capture the impurities precipitating downward, an impurity capture device 16 having a cross section in the form of an umbrella or a mushroom or the like may be provided integrally with or separately from the sheath 1 to form low electric field groove portions 16A and 16B on the lower portion of the sheath 1.

Figure 6:
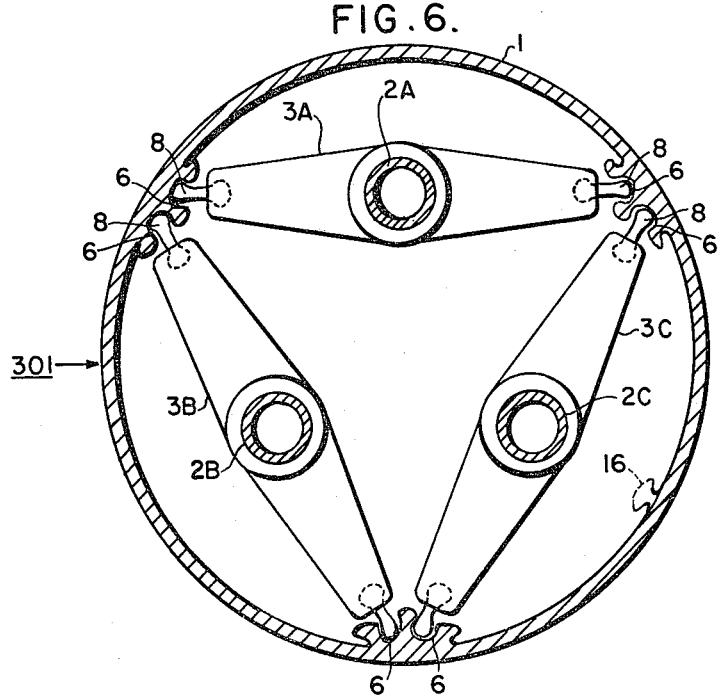
FIG. 6 is a cross-sectional view of a three-phase bundled type gas insulated transmission line.

FIG. 6 shows a cross-sectional view of the present invention applied to a three-phase bundled type transmission line 301. All the structures of the groove 6 and end 8 as described in conjunction with FIGS. 1 through 5 are possible to be applied to this embodiment. An A phase conductor 2A, a B phase conductor 2B and a C phase conductor 2C integral with the insulating spacer 3A, the insulating spacer 3B and the insulating spacer 3C respectively, are assembled within the sheath 1 by fitting them into the grooves 6. This can provide a gas insulated transmission line very simple in structure and high in economy.

Still, while the grooves 6 and the sheath 1 may be formed of different elongated members as described previously, it is desirable that said members are particularly strongly mounted to the inner wall surface of the sheath adjacent to the end of the insulating spacer at which forces are always concentrated. As mounting methods, one may adopt a method of forcing into the sheath the insulating spacer which was formed integral with the conductor and fitted into said members, and screw threading bolts into threaded holes on said members through holes bored on the sheath by expecting preliminarily the mounting portions thereby to effect the hermetic clamping, or a method of mounting said members to the sheath from the outer side of the sheath through somewhat large holes and in the form of plug welding while serving as hermetic sealing.

By the foregoing, there are provided economic gas insulated transmission lines of the single-phase and three-phase bundled types high in reliability and easy to be assembled.

What is claimed is:

1. A gas insulated transmission line comprising:
    a plurality of cylindrical sheath sections having at least one conductor therein and being lengthwise connected to one another;
    an electrical insulating gas filling the interior of said sheath sections;
    a two-leg type insulating spacer, having two ends, mounted to said conductor for insulatably supporting said conductor within said sheath sections; and
    receiving means disposed in said sheath sections and extending axially throughout the length of the connected sheath sections and normal to said spacer ends and receiving said two ends of said insulating spacer,
    said receiving means comprising grooves formed integrally with each sheath section and extending throughout the length of each sheath section, each groove having two edges with portions which protrude in opposite directions respectively, and impurity capture grooves formed between said protruding portions and the inner surface of the sheath sections.

2. A gas insulated transmission line comprising:
    a plurality of cylindrical sheath sections having at least one conductor therein and being lengthwise connected to one another;
    an electrical insulating gas filling the interior of said sheath sections;
    a two-leg type insulating spacer, having two ends, mounted to said conductor for insulatably supporting said conductor within said sheath sections, each end of said insulating spacer being formed of a material different from the material from which the remainder of the insulating spacer is formed; and receiving means disposed in said sheath sections and extending axially throughout the length of the connected sheath sections and normal to said spacer ends and receiving said two ends of said insulating spacer, each end of the insulating spacer being coated with a material low in coefficient of friction and having a contact member biased into contact with the bottom surface of the respective groove by means of a spring.

3. The gas insulated transmission line according to claim 2, wherein said receiving means comprises grooves formed integrally with each sheath section and extending throughout the length of each said sheath section.

4. The gas insulated transmission line according to claims 1 or 3 wherein the cross section of the inner wall of each groove has its width in the circumferential direction of said sheath sections shaped such that the interior of the groove is more widened than the opening thereof and each end of said insulaating spacer is formed into a shape corresponding to that of the groove.

* * * * *